United States Patent Office 3,204,750
Patented Sept. 7, 1965

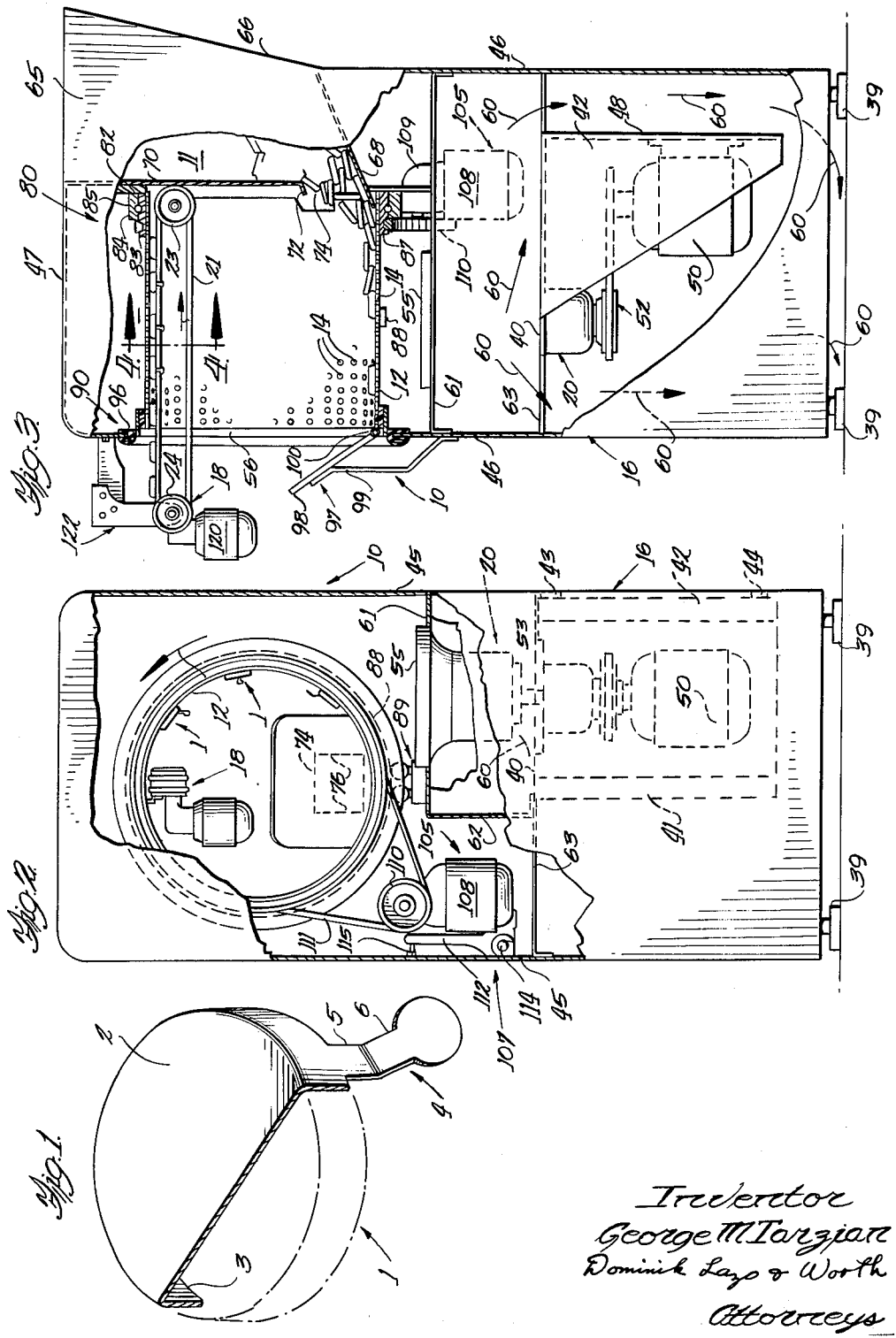

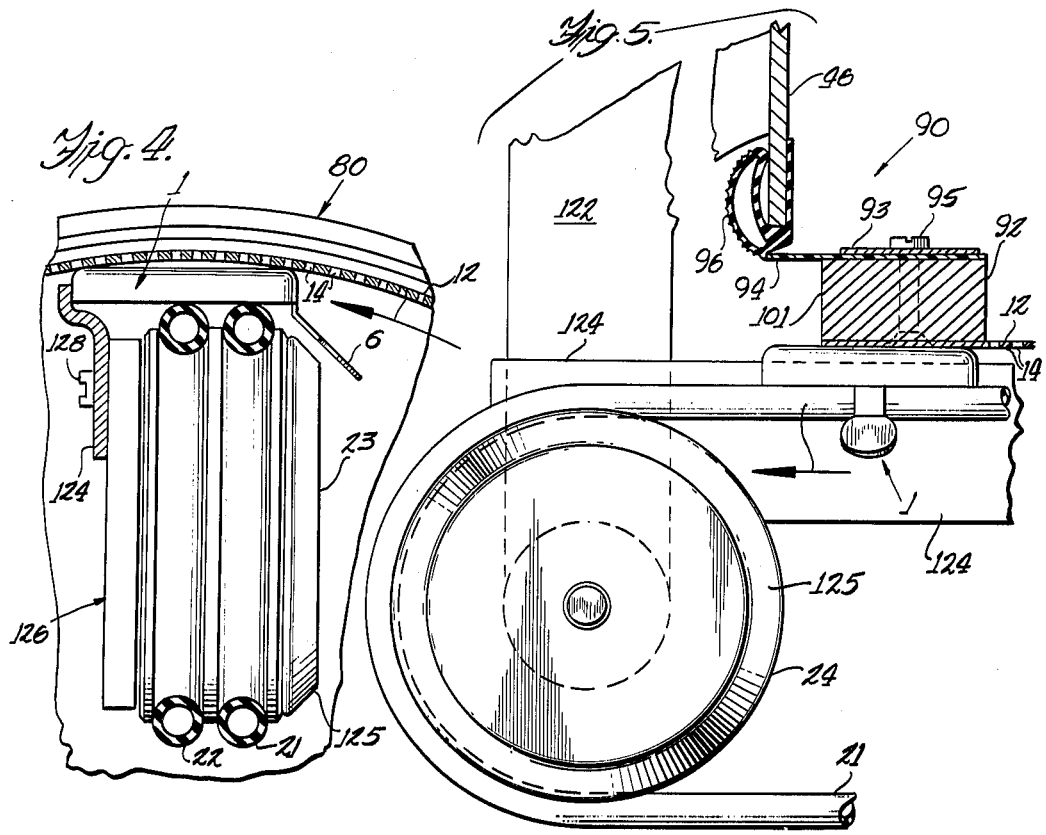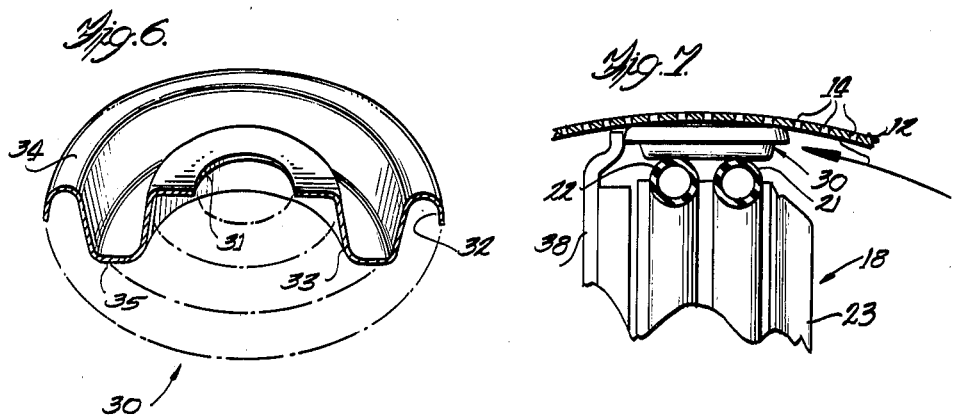

3,204,750
METHOD AND APPARATUS FOR HANDLING LOOSE PARTS
George M. Tarzian, Chicago, Ill., assignor to American Can Company, New York, N.Y., a corporation of New Jersey
Filed Jan. 2, 1962, Ser. No. 163,508
17 Claims. (Cl. 198—33)

This invention relates to a method and apparatus for handling loose parts. One aspect of the invention relates to a feeding mechanism for the transferring of loose parts. Also the invention contemplates a method and apparatus for orienting loose parts to a position desired for a subsequent operation while transferring the parts to the subsequent operation. Additionally the invention relates to a method and apparatus for handling parts by the use of suction. Still another aspect of the invention relates to a method and apparatus for handling parts having a prominent suction responsive shape on at least one side, a preferred example of such parts being a light weight cup-shaped part such as bottle caps, caps for aerosol cans and the like.

The application of automation principles to manufacturing and assembling operations has demanded the development of methods and apparatus for an orderly transfer of work pieces between successive operations. A subsequent operation also often requires that the work piece be delivered into a predetermined orientation. A characteristic example is the automatic filling and assembly of an aerosol package where a protective cap is to be automatically assembled over the valve and where a stream of such caps is to be delivered in proper orientation for capping to the cap-applying operation.

The present invention provides an automatic transfer method and apparatus capable of delivering properly oriented parts selected from a plurality of randomly positioned parts, such as light weight caps dumped into a bin.

One object of the invention is a method of and apparatus for delivering properly oriented parts selected from a plurality of randomly positioned parts.

A further object of the invention is provision of a method and apparatus for transferring parts in an ordered fashion from a plurality of randomly positioned parts to a position for a subsequent operation.

One embodiment of the present invention contemplates the handling by transfer, or orientation, or both, of parts having a suction responsive shape on at least one side, preferably a cup-shaped part.

Included among the objects of the invention is provision of method and apparatus for the handling by transfer, or orientation, or both, of parts having a suction responsive shape on at least one side, preferably a cup-shaped part.

The preferred embodiment of the invention employs suction as an agency for effecting one or both of the transfer or the orientation, of parts.

One object of the invention is provision of a method and apparatus to employ suction as an agency for effecting one or both of the transfer or the orientation, of parts.

Still another object of the invention is to provide a method or an apparatus having but not restricted to the foregoing objects taken alone or in any combination of two or more of the objects.

The present illustration of the invention to be described in detail contemplates placing bottle caps or the like in a hollow cylindrical drum having a perforate cylindrical wall. The drum is supported so that the perforate wall revolve about a horizontal axis. A blower draws air through the perforate wall of the drum, creating a suction which causes a portion of the bottle caps to be sucked against the wall. The drum is rotated, tumbling the caps in random fashion and bringing a portion of the caps into suction relationship to the perforate wall. Caps having their flat or web portion against the wall remain thereon during the rotation and caps otherwise positioned fall off. The drum is rotated until the caps remaining on the wall reach a runout means which removes the caps from the suction relation to the drum wall. The runout means can advantageously further orient the caps, if need be. Different equivalents are, of course, contemplated. For example, the drum might be vertical, an air blast rather than suction may be used, etc. Submerged operation in a liquid as the actuating medium has advantages where the buoyancy of the part assists in orientation.

Other objects, advantages, features and embodiments of the invention will become apparent as the description proceeds.

In the drawings:

FIG. 1 is a perspective partially cutaway view of an example of a part handled by the invention.

FIG. 2 is a rear elevation assembly view of an apparatus embodying the invention and which has a portion of the casing cut away.

FIG. 3 is a side elevation view, partly cut away and partly in cross section of an apparatus embodying the invention.

FIG. 4 is an enlarged front elevation cross sectional view of the relationship of the drum wall, the part of FIG. 1, and the runout means as seen along section 4—4 of FIG. 3.

FIG. 5 is an enlarged elevation view, partly in section, of a portion of the apparatus shown in FIG. 3.

FIG. 6 is a perspective representation of another exemplary embodiment of a part handled in the practice of the invention, a portion of the part being cut away.

FIG. 7 is a view similar to that of FIG. 4 for handling the part illustrated in FIG. 6.

*Description of the invention in connection with the FIG. 1 part*

The invention will first be described, in connection with, by way of example, the handling of a part constructed pursuant to FIG. 1 wherein the cup-shaped part 1 is shown to have a suction responsive shape, or support surface, defined by the back 2 from which depends a continuous flange 3. A handle or tab 4 extends downwardly from one portion of the flange. The handle has a connector leg 5 which extends from and is coextensive with the flange. A tab portion 6 extends obliquely outwardly from the connector leg. The part preferably circular and of integral one-piece construction. The part can be formed in any suitable manner, i.e. stamping from a metal sheet or molding from plastic.

Referring to FIGS. 2 and 3, the loose parts are delivered to a hopper 11 which is part of the transfer feeding mechanism 10. The parts move by gravity down through the hopper and are finally dispensed to the inside bottom of a drum 12. The drum 12 is preferably a hollow cylindrical member having air passage means such as the plurality of perforations 14 which render the cylindrical wall of perforate structure.

The drum 12 is revolvably supported within a casing means 16 for operatively shrouding the drum and also for supporting the various portions of the mechanism such as the runout means 18 and the blower assembly 20. Advantageously, the casing means also defines the hopper 11 as being structurally integral with the other constituents of the transfer mechanism. The runout means is preferably disposed adjacent the upper part of the drum with a spacial relationship such as shown in FIGS. 4 and 5 which permits receiving the parts between the runout means and the drum and to remove such parts from inside the drum using the runout means. The runout means, as will be described further below, includes a pair of horizontally spaced apart endless belts 21, 22 which are respectively supported upon suitable pulleys 23, 24. The belts are oriented substantially transversely to the path of travel of parts sucked or otherwise urged by air transfer against the perforated cylindrical wall responsive to the draft induced by the blower 20. The plurality of parts fed into the bottom of the drum are tumbled, and as the backs 2 of the parts come into suction engagement with the drum, they remain on the inside of the drum wall (see for example FIG. 2) and are moved through a vertical path to a position where the runout means 18 engages the part and removes it from inside the drum. Meanwhile, the blower 20 draws sufficient air through the perforations 14 in the cylinder wall such that the parts are sucked against the cylinder wall and remain thereon when their backs 2 face toward the wall and their flanges 3 extend radially inwardly of the wall.

Referring to FIGS. 4 and 5, it will be observed that the part 1 orients itself relative to the runout means by engagement of the tab or handle with the belt which causes the back and flange portion of the part to rotate to a position to be drawn between the belt and the drum so that the tab is on the right hand side of the belt as seen in FIG. 4. This action occurs when a part meets the belt with the metal 6 forward as a result of the high runout speed of the belt (200-300 ft. per minute) which causes the part to rotate an appropriate amount. In this manner, feed rates upwards of 1,000 to 1,500 parts per minute have been achieved. This coaction has been achieved with various drum rotational speeds, 16 to 20 revolutions per minute having been employed, although the rotational speed is not critical.

*Figures 6 and 7*

Referring to FIGS. 6 and 7, there is shown an example of the manner of handling loose parts of a different shape in order to further illustrate the variety of parts susceptible to handling by the practice of the invention.

FIG. 6 illustrates such a part which may comprise, for example, an aerosol container cap 30 of flanged, reversely dished shape for sealing one end of such a container and for supporting an aerosol valve in a centrally located hole 31. A bead 32 extends around the outer edge of the cap and provides a means for sealingly engaging the aerosol container by being crimped thereto. A reversely dished portion 33 which resembles a flanged channel extends between the bead 32 and the hole 31. The cap 30 has a top 34 and a bottom 35.

The cap 30 is sucked against the drum by the draft induced by the blower 20 on those occasions when the tumbling of the parts by rotating the drum brings the top 34 into suction engagement with the perforate cylindrical wall 12. Continued rotation of the drum brings the part 30 into engagement with the runout means 18. A stop bar 38 stops the parts 30 and permits the runout means to positively engage the cap and to remove it from inside the drum responsive to driving the pulleys and belts 21-24. The stop 38 is preferably a bar of any suitable shape extending parallel to the belts 21, 22.

*Summary of operation thus far*

From the above description it will be observed that a variety of parts are susceptible to handling in the course of practicing the invention. The loose parts, exemplified by the various types of caps 1, 30, are disposed in the hopper 11, having been placed there manually, fed in from a conveyor belt which transports them from the place of forming, or the like. The parts are fed from the hopper into the perforate drum. The blower 20 creates a pressure differential across at least a portion of the perforate drum wall which has the effect of providing a higher pressure inside of the drum contrasted with the pressure between the drum and the blower. The casing means defines an airflow passage (described in detail below) between the drum and the blower.

The drum is rotated while the blower draws air therethrough. Rotation while creating the pressure differential causes those parts oriented in a preselected relation to the perforate wall to be maintained against the wall in response to the pressure differential and to travel upon and with the wall to a predetermined location. Preferably said location is at or immediately adjacent to the uppermost point in the path of drum rotation. At said location the parts are removed from the wall by the runout means and transferred outside of the drum. In this fashion, the respective parts are transferred in a predetermined orientation such that they are properly positioned for the next subsequent operation such as capping, sealing a container, or the like.

Speaking broadly for a moment, it will be observed that the method of handling loose parts as contemplated by the invention involves placing a plurality of loose parts in a perforate-walled chamber such as the drum 12. The parts are then tumbled by moving the perforate wall upwardly through a predetermined path while at the same time a pressure differential is created to provide a higher pressure within the chamber. The loose parts handled are respectively shaped to be maintained upon the chamber wall, i.e. upon the perforate drum wall 12, only upon being tumbled into a predetermined orientation relative to the wall. Exemplary of such parts are cup-shaped parts having a flat suction surface or its equivalent (2, 34) on one side and an irregular surface on the other. Upon continuing to move the perforate wall until parts adhering thereto by reason of the suction have reached a predetermined position, the respective parts are then removed in a suitable manner such as by operating the runout means 18. Preferably, the suction effect is achieved by drawing air through the drum from inside the drum by an induced draft means. The quantity of air handled is sufficient to cause the suction effect. An actual embodiment has employed a three-quarter horsepower blower delivering approximately 1,000 cubic feet per minute. The manner of blower operation has been successfully manipulated to handle between 1,000 to 2,000 cubic feet per minute.

It will be observed that the embodiment of FIG. 1 represents the structure of a part which is so shaped as to achieve a further orientation during the removal of the part from inside the drum, as for example, by the coaction between the tab 6 and the belt which causes the part to assume the position of FIGS. 4 and 5. Where desirable, the portion of the part causing this further orientation may be removed in a later operation if the tab or its equivalent is desired merely for locating and orienting purposes.

Additional aspects of the invention are described below.

*Fluid transfer means and associated casing means*

The casing means 16 constitutes an assembly for shrouding and supporting the drum, for defining an air conduit between the blower and the drum, and in the preferred embodiment further includes a hopper or other feeding means supported to receive loose parts and direct them into the drum. The casing means is advantageously built up from a plurality of appropriately shaped sheets of material and may be advantageously be of all welded construction. Appropriate access doors and holes are provided as necessary, not being shown inasmuch as these are conventional features. Access is desired on occasion to such parts as motors, belts, and the like to permit inspection, repair, maintenance or like operations with respect to such parts.

A plurality of legs generically designated 39 support the casing means from the ground or floor. If desired, leveling means can be incorporated in the support means or legs 39 as an aid to aligning the apparatus horizontally and vertically. The leveling means may comprise a threaded block secured to the casing and corresponding threads on vertical members of the legs whereby individual legs can be raised or lowered.

In the lower portion of the casing means 16 is disposed a horizontally extending blower drive means support plate 40 which extends across the casing (FIG. 2) and which extends only part of the distance back and forth of the casing as seen in FIG. 3. The plate 40 has flanges by which it is advantageously welded to the casing side walls both of which are designated as 45. The front and rear casing walls are generically designated 46. As previously mentioned, the casing walls are welded together and are advantageously enclosed at the top by a top 47. The bottom of the casing is preferably left open whereby air drawn through the apparatus may be exhausted.

A pair of blower drive support brackets 41, 42 are secured to and depend from the plate 40. The bracket 42 is advantageously welded or otherwise secured to the right hand side wall 45, spacers 43 and 44 being employed to assist in effecting the connection between the right hand wall 45 and the bracket 42. Spacer 43 can advantageously comprise a flange of plate 40. A web 48 (FIG. 3) extends between the two brackets.

An electric motor 50 and a transmission 52 constitute a means for driving the blower means 20. The transmission 52 connects the motor 50 to the blower impeller and can comprise any suitable combination of couplings, belts and pulleys, gear box, or the like. The illustrated embodiment shows a belt and pulley connected to a gear box which then drives the blower impeller by means of the blower shaft 53 which extends through a hole in the support plate 40. Advantageously the motor 50 is supported from the web 48, being secured thereto in any suitable fashion as by nuts and bolts. The transmission 52 is advantageously supported from the support plate 40, being secured thereto by suitable means such as nuts and bolts.

The blower means may comprise any suitable type, and in the preferred embodiment should comprise an air pumping means capable of inducing a draft in the fashion described above and discharging the air or other gas handled to the atmosphere. As illustrated, the blower includes a shroud 55 which encases the fan or blower impeller that is mounted on the shaft 53. The fan shroud 55 is open at its upper end whereby its receives air drawn through the perforation 14 in the drum. The vast bulk of the air is drawn in through the open end of the drum and the corresponding opening in the shroud, designated as 56 in FIG. 3. The blower assembly 20 is thus seen to constitute an air transfer means for drawing air through the opening 56, thence through the perforations 14 in the drum, and subsequently discharging the same. Moreover, the air transfer means is capable of handling a volume of air sufficient to provide the suction required to maintain the parts being handled in suction engagement with the perforate wall of the drum while the drum rotates.

Further in connection with the flow of air through the casing means, the arrows 60 in FIG. 3 represent the path of air after leaving the impeller shroud 55. The air leaves the impeller, travels around the support plate 40 and equipment associated therewith and by moving in a generally vertically downward path is discharged from underneath the casing means. Thus, the lower part of the casing means 16 constitutes a means for defining an air conduit between the drum 12 and the air transfer means, and further constitutes an air discharge means to direct the air out of the casing in any appropriate fashion. The plate 40 may advantageously be perforated to promote a flow of air over the motor 50, thereby cooling the latter.

It will be observed from FIGS. 2 and 3 that a shroud support plate 61 extends longitudinally (that is, back and forth) of the apparatus to support the upper end of the blower impeller shroud. A vertical support plate 62 extends between the blower drive support plate 40 and the shroud plate 61 to provide support for the latter. The left hand portion 63 of the blower support plate 40 advantageously extends the complete internal longitudinal distance inside the casing to prevent short circuiting air. Thus, the plates or portions thereof 61, 62 and 63 provide a type of seal whereby air may only be drawn into the impeller shroud 55 from the perforated drum 12.

*Hopper*

The hopper is advantageously formed integrally within the casing in such fashion that the parts being handled are fed to a proper location within the drum. In the embodiment shown, a gravity feed type hopper is disclosed which is advantageously arranged to receive parts through its open upper end 65 from a conveyor or the like which has transported the parts from a previous operation.

The hopper 11 is defined by the walls of the casing. The upper portion 66 of the rear casing wall 46 is sloped to enhance the manner in which the parts are caused to gravity feed. The bottom of the hopper 68 extends between the sloped wall 66 to a point slightly inside the drum 12. The bottom 68 is preferably at an angle of at least 25° to the horizontal in order to facilitate the sliding of the light weight parts and to reduce the chances of bridging which would stop the flow of parts. On occasion it may be preferable to provide a vibrating means to break up any bridging which may form. A vertical partition 70 separates the hopper from the drum and has at its lower end a flange 72 to facilitate the direction of parts into the drum. The partition 70 extends the full width between the casing sidewalls 45. The opening 74 between the flange 72 and the bottom 68 of the hopper does not extend the full width of the apparatus as is seen in FIG. 2 wherein the opening 74 is superimposed on the apron 98. The sides of the hopper extend from the sides 76 of the opening in a sloping fashion to promote the direction of parts through the opening.

It is to be understood that incorporation of the hopper into the apparatus is advantageous in that it provides an integral unit with the parts properly oriented for the placement of the parts being handled within the drum. However, the invention contemplates providing a hopper or other feeding means separately from the apparatus encased within the casing means 16.

*Drum support and drive means*

Referring mainly to FIGS. 3 and 5, there are illustrated means for supporting the drum, including means for sealing the forward side of the drum. The latter means enhances the direction of air flow through the opening 56, thence through the perforations 14 and into the blower intake 55. FIG. 2 will also be referred to in describing the drum drive means.

A combination thrust and radial bearing is defined by the rear bearing assembly 80 (FIG. 2), the rear bearing assembly including a support ring 82 secured on the partition 70, to which is further mounted the split ring outer races 84, 85. The split rings are secured to the support ring by any suitable means such as bolts. An inner race 83 is secured as by bolts or screws to the rear end of the drum 12. The inner race is preferably a one piece member also providing a pulley surface 87 for receiving the belt 111 of the drive means. A plurality of balls is disposed between the two races, the balls being separated by a spacer (not shown). Although only one row of balls is illustrated, a plurality of rows can be provided. The raceways are arranged so that a portion of each ball is received therein, thus providing the requisite thrust and radial bearing relation. Advantageously in manufacture, the raceways are V-shaped inasmuch as extremely heavy bearing loads are not ordinarily encountered in service.

Additionally, the expense of manufacture is reduced. Moreover, use of a V-shaped raceway in each race renders it much easier to align the split rings 84, 85.

A bracing ring 88 is provided in belt-like fashion around the intermediate periphery of the drum 12. The ring 88 rigidifies the drum and is secured thereto by any suitable means such as welding, screws, nuts and bolts or the like. On those occasions where problems occur in maintaining the alignment of the drum relative to its supports, a roller assembly 89 (FIG. 2) can be positioned to engage the lower portion of the bracing ring 88. The roller assembly 89 advantageously comprises at least two rollers spaced around the periphery of the ring, whereby a rollable support is obtained. The use of the support roller assembly 89 is, however, optional.

The forward sealed bearing assembly 90 (FIGS. 3 and 5) constitutes a journal type bearing and includes a forward ring 92 secured to the drum 12 by any suitable means. A journal sealing ring 94 is secured to the forward ring by any suitable means such as a peripherally extending clamping strip 93 between which and the forward ring 92 a plurality of screws 95 secures the journal sealing ring 94. The ring 94 is of endless construction and may advantageously be molded from plastic or formed from a strip thereof. Preferred plastics are "Teflon" (a tetrafluoroethylene resin) or it may be made of nylon (a long chain polymeric amide with recurring amide groups as part of the main polymer chain) or other materials having low friction properties combined with good strength characteristics in thin sections.

The forward sealing ring 94 slidingly engages the resilient sealing journal 96 is preferably molded from a suitable resilient polymeric material such as natural rubber, synthetic rubber, blends of the two or the like. The journal is molded preferably in one piece form so that it fits the opening 56 in the forward casing wall. The opening is preferably circular as should be the case for a journal bearing. In this fashion, the molded sealing journal resiliently supports and engages the sealing journal ring.

An alternate manner of supporting the drum at its forward end would include a sealing structure substantially as described above, especially in connection with FIG. 5 but wherein the forward ring 92 is extended rearwardly a small amount, the rearward extension being supported on a pair of radially spaced apart rollers engaging the periphery of the extension, in much the same manner that the intermediate ring 88 is engaged by its alternatively provided rollers 89.

The apron assembly 97 is provided adjacent the forward end of the drum in order that parts being tumbled in the drum will not fall out of the drum due to the tumbling action. The illustrated apron assembly includes a panel 98 supported on a bracket 99 and having a sealed bead 100 preferably of Teflon which engages the forward face 101 of the forward ring 92. The sealed bead provides a sliding seal of long wearing properties, the principal value of the seal being to minimize the chance that a portion of the parts being held be drawn in between the drum and the apron assembly. On some occasions it may be desirable to eliminate the seal, but this depends on the particular shape of the part being handled. As a further alternative construction, the panel 98 can be spring biased about a pivot on the bracket 97, whereby the bead 100 is maintained in sealing engagement with the forward face 101.

The drive means assembly 105 includes a motor 108 along with an appropriate transmission mounted on a belt tension maintaining means 107. The drive means 105 drives the drum through the electric motor 108, a transmission assembly generically designated as the gear 109, and a drive pulley 110. It is preferred to use a V-belt 111 to transfer power from the drive pulley 110 to the belt groove 83 on the rear bearing inner race.

The means for maintaining tension in the V-belt 111 includes a mounting bracket 112 on which the motor, gear box, and pulley are mounted. The bracket is pivotally supported to revolve about the pivot 114. An adjustable stop comprising a screw threaded member supported in a threaded female joint, 115, serves to determine the limit of counterclockwise rotation of the drive means 105.

In review it will be observed that the drum is horizontally supported to revolve about the axis of the cylindrical perforate wall defining the drum. Moreover, the manner of support is such that a sealed path is established whereby substantially all of the air flows through the perforations in the drum. Some slight amount of air is drawn in through the mass of parts in the hopper, but the pressure drop through such mass is generally sufficient to cause most of the draft to come from the flow through the opening 56.

*Runout means*

The runout means 18 (FIGS. 2–5 and 7) is for removing a part from inside the drum responsive to rotation of the drum once the parts have been separated from the mass thereof being tumbled in the bottom portion of the drum. The runout means preferably is oriented obliquely with the path through which parts travel when engaged by suction on the inner drum wall. Preferably, the runout means 18 is disposed vertically above the drum axis adjacent the uppermost portion of the drum whereby parts engaged by suction with the drum wall achieve a substantially inverted position by the time they reach the runout means, especially as contrasted with the position in which the parts were when initially sucked against the inner drum wall.

The preferred embodiment of the runout means is to provide two spaced apart travelling members which provide a kind of friction engagement with the parts to be removed from the drum. Such elements have already been described as the belts 21 and 22 supported on the pulleys 23 and 24.

Referring to FIGS. 4 and 7 the preferred form of belt is illustrated as being a hollow tubular endless power transmitting belt member constructed of a resilient material. Resilient materials are well known in the art and may comprise natural or synthetic rubber, a mixture of the two, preferably in molded form and even more preferably reinforced by appropriate layers of fabric and the like in accordance with the belt construction art. Such belts are termed "O-ring belts."

The preferred construction of the runout means employing the O-ring belts, coupled with the span between the two pulleys 23, provides a resilient means for receiving the parts as the drum brings them into engagement with the runout means. Slight flexure of the belt responsive to engagement of the part (e.g. FIGS. 5 and 7) between the belt and the drum provides a gentle biasing action which serves to produce the requisite friction to move the parts in oriented relationship out of the drum and to the end of the belt from whence they are removed by an appropriate transfer means such as a vacuum head which picks up the parts one by one and transfers them to a subsequent operation. Alternatively, the belt can be extended to deliver the parts immediately to the next succeeding operation.

The rear runout pulley 23 is supported in any appropriate fashion, e.g. between pillow blocks, from the partition 70. The forward runout pulley 24 is driven by an appropriate means such as the electric motor 120. The electric motor 120, and the associated transmission between it and the forward pulley 24, as well as the pulley 24 are supported from a bracket assembly 122 which is in turn connected to the forward wall 46 of the casing assembly.

The two pulleys 23 and 24 are generally constructed alike, each having two grooves therein to receive the belts and preferably having an oblique face 124 to aid in camming parts such as shown in FIG. 1 having a tab 6 or other extension which requires orientation in the fashion described with respect to FIGS. 1–5.

The pulleys and belts constituting the runout means are mounted in the proper spacial relationship to the drum whereby the frictional engagement of the part being handled is enabled as previously described with respect to the longitudinal and cross sectional flexing of the belt when a part is positioned as shown in FIGS. 4 and 5 between the belt and the drum. The space relationship between the belts and the drum is such that the uppermost portion of the belts are spaced from the adjacent portions of the drum by a distance slightly less than the thickness of the loose parts. This not only promotes engagement between the runout means and the parts, but it also causes an improved coaction wherein the part is drawn in upon the runout means in much the same fashion that, for example, a belt tends to center itself on a crowned pulley.

A stop bar 124 as seen in FIG. 4 (corresponding to stop bar 38 in FIG. 7) extends longitudinally between the runout pulleys 23 and 24. As best seen in FIG. 5, the stop bar extends outboard of the point of rotation of each pulley. A stop bar mounting plate 126 (FIG. 4) advantageously extends the full length of the stop bar whereby the stop bar can be adjusted in its position according to the dimensions of the parts to be handled, using adjusting means such as the screw 128, and if necessary to dispose shims between the stop bar and the plate 126. The plate 126 may advantageously be secured to the supporting bracket assembly 122.

The runout means 18 thus provided is able to remove a part from inside the drum responsive to rotation of the drum. Additionally, the runout means transfers the part removed outside the drum in a predetermined orientation whereby the parts so removed are presented in proper oriented position for the next subsequent operation, whatever it may be.

*Additional matters*

A number of electric motors are employed in connection with the apparatus disclosed above. These are conventional motors and it is to be understood are wired, fused and so forth in the conventional manner therefor.

Throughout the above discussion, air has been described as the gas drawn through the apparatus. In most applications such would be the case. However, in handling certain metals it may be desired to subject them to a specific atmosphere, e.g. nitrogen, carbonizing, or the like, in which case the term "air" is intended to include the handling of such gases. Where special gases are circulated through the unit, it is preferred that a closed loop system employing them be provided, such system always being under positive pressure even on the suction side of the fan or blower assembly 20 in order to eliminate the leakage of air into the system. Moreover, appropriate filtering means and return conduit means between the fan exhaust and the air inlet 56 are comprehended as part of such a system. Also, the invention includes using forced draft means to force air into the drum, as well as the induced draft means described.

Various examples have been given above with respect to operational speeds and other conditions. The data given there refers to a situation wherein a 16 inch diameter drum was employed. Where different size drums are contemplated, rotational speeds and the like can be varied to suit the particular condition.

While various theories and operating conditions, in addition to various embodiments, have been described it is to be understood that the invention comprehends all those modifications, changes, substitutions, use of equivalents, and alterations which are within the spirit as well as the letter of the invention, and the invention is not to be limited solely to the specifically disclosed and described method and apparatus. Moreover, while various theories and hypotheses concerning different phases of the operation have been advanced in order to promote clarity, they are not to serve as a limitation or restriction upon the invention.

I claim:
1. A transfer feeding mechanism for the handling and orienting of loose parts comprising, in combination,
    an endless perforate movable wall member adapted to thereupon receive and support loose parts,
    means for moving said wall member through a predetermined path from a lower level to a higher level,
    air transfer means for moving air through said perforate wall member to create a predetermined pressure differential thereacross,
    casing means for supporting and shrouding said wall member and for defining an air conduit between said air transfer means and said wall member whereby loose parts are air driven into oriented engagement with said wall member and are maintained thereon by said predetermined pressure differential, and
    runout means for removing said oriented parts from engagement with said wall member at said higher level and for transferring the removed part outside said wall member.

2. A feeding mechanism according to claim 1 wherein said wall member is a rotatably supported drum with a perforate cylinder wall.

3. A feeding mechanism according to claim 1 wherein said wall member is a rotatably supported drum with a perforate cylindrical wall, and wherein said runout means comprises an endless belt supported to travel substantially transversely to the path of travel of oriented parts upon the drum.

4. A feeding mechanism according to claim 1 wherein said runout means comprises an endless belt drivingly supported upon pulleys to travel substantially transversely with the path of travel of oriented parts upon said wall member.

5. An air transfer feeding mechanism for handling and orienting loose parts comprising, in combination,
    a drum having a perforated cylindrical wall,
    support means for revolvably supporting said drum for rotation about the longitudinal axis thereof,
    means for rotating said drum about said axis,
    air transfer means for drawing air through said perforated cylindrical wall from inside said drum to create a pressure differential thereacross,
    means for operatively shrouding said drum and connected to the air transfer means whereby loose parts in a predetermined relation to said wall are air driven into oriented engagement therewith and are maintained thereon responsive to said pressure differential across the perforated cylindrical wall, and
    runout means mounted for movement in a direction substantially transverse to the path of travel of the oriented parts upon said perforated cylindrical wall of the drum and disposed adjacent said perforated cylindrical wall above said axis to remove oriented parts therefrom in a predetermined orientation.

6. A mechanism according to claim 5 wherein said runout means comprises a resilient endless belt supported between pulleys whereby the belt resiliently receives and engages oriented parts in the span between pulleys.

7. A mechanism according to claim 5 wherein said runout means is disposed adjacent the uppermost portion of said drum and is spaced from the drum by a distance slightly less than the thickness of the loose parts whereby an oriented part is drawn upon the runout means.

8. A mechanism in accordance with claim 7 wherein said runout means comprises resilient endless belt supported between pulleys whereby the belt resiliently receives and engages oriented parts in the span between pulleys.

9. An air transfer feeding mechanism for handling and orienting loose parts comprising, in combination,
   a hopper,
   a cylindrical drum having a perforate cylindrical wall disposed on a substantially horizontal axis,
   means for rotating said drum about its horizontal axis,
   air transfer means for drawing air through said perforated cylindrical wall from inside said drum,
   means for operatively shrouding said drum and connected to the air transfer means to create a pressure differential at the wall of the drum whereby loose parts will be air driven into oriented engagement with said wall and are maintained thereon by said pressure differential,
   means operatively connecting the hopper to the drum to direct parts from the hopper into the drum while the latter is rotated, and
   runout means mounted for movement in a direction substantially transverse to the path of travel of the oriented parts along the rotating wall of the drum to remove oriented parts therefrom in a predetermined orientation.

10. A method for handling and orienting loose parts which are of such a shape as to be supportable on only one side thereof when subjected to a predetermined pressure differential, said method comprising the steps of
    placing a plurality of loose parts in a drum having a perforate wall,
    creating said pressure differential across a portion of said wall to provide a higher pressure within the drum,
    rotating said drum to move said perforate wall upwardly through a predetermined path to tumble said parts,
    whereby parts having said one side thereof disposed adjacent to said wall are drawn into oriented engagement therewith in response to the said pressure differential and travel upwardly with said wall to a predetermined location, and
    engaging said oriented parts within said drum at said predetermined location to stop said travel thereof and to remove said stopped parts from said drum in a path which is substantially parallel to the longitudinal axis of said drum.

11. A method according to claim 10 wherein during said removing step said oriented parts are engaged by a conveyor which moves each of said oriented parts to substantially the same relative position thereon prior to the removal of said parts from said drum.

12. A method of handling and orienting loose parts comprising the steps of
    feeding a plurality of loose parts into a drum having a perforate cylindrical wall,
    rotating said drum about a horizontal axis to tumble said parts,
    drawing air from inside said drum through said perforate wall in a volume sufficient to cause parts oriented in a preselected relation to be drawn against said perforate wall and to travel upwardly therewith during rotation of said drum, and
    engaging the oriented parts on said perforate wall when they are substantially at the uppermost position achieved during rotation of said drum to stop the travel of said oriented parts on said wall and to remove said stopped parts from said drum in a path which is substantially parallel to said horizontal axis about which said drum is rotated.

13. A method according to claim 12 wherein during said removing step said oriented parts are engaged by a conveyor which moves each of said oriented parts to substantially the same relative position thereon prior to the removal of said parts from said drum.

14. A fluid transfer feeding mechanism for handling and orienting loose parts of a predetermined shape, each of said parts having a surface which will support the part when subjected to a predetermined pressure differential, said mechanism comprising, in combination, a rotatable drum having a perforate wall to receive and support loose parts thereupon, means for drawing fluid from the interior of said drum through said perforate wall to create said predetermined pressure differential across said perforate wall, whereby each of said loose parts is drawn into engagement with said perforate wall to orient said parts thereon, means for rotating said drum about a predetermined axis to move said oriented parts on said perforate wall from a lower level to a higher level, and movable means for removing said oriented parts within said drum at said higher level from the perforate wall of said drum.

15. The mechanism of claim 14 wherein each of said parts comprises a portion extending therefrom and being disposed out of the plane of said support surface, and wherein said removing means engages said portions of oriented parts to further orient said oriented parts before removal from said drum.

16. A fluid transfer feeding mechanism for the handling and orienting of loose parts which are of such a shape as to be supportable on only one side thereof when subjected to a predetermined pressure differential, said feeding mechanism comprising in combination:
    a tubular drum having at least one open end and having a curvilinear wall with fluid passage means therein,
    means for feeding such loose parts into said drum,
    means for rotating said drum about its tubular axis,
    fluid transfer means for moving fluid out of said drum through said fluid passage means,
    means for shrouding said drum to define a fluid conduit between said fluid transfer means and said drum to create said predetermined pressure differential across the curvilinear wall of said drum, whereby loose parts having said one side thereof disposed adjacent said curvilinear wall are fluid-driven into oriented engagement with said wall and are maintained thereon by said pressure differential and carried upwardly therewith through a curvilinear path of travel,
    stop means disposed adjacent said wall for stopping the curvilinear motion of said upwardly carried, oriented parts, and
    runout means disposed adjacent said stop means and said wall for engaging oriented parts which have been stopped by said stop means and for transferring said parts outside of said drum through an open end thereof in a predetermined orientation.

17. The mechanism of claim 16 wherein said stop means comprises an elongated plate extending through said drum in substantially parallel relation to the tubular axis thereof, and said runout means comprises an endless belt having one of its flights positioned to engage said stopped parts and extending substantially parallel to said tubular axis.

References Cited by the Examiner

UNITED STATES PATENTS

| 2,384,820 | 9/45 | Dodwell | 221—211 |
| 2,920,740 | 1/60 | Whitted | 198—33.1 |

FOREIGN PATENTS 724,498  2/55  Great Britain.

SAMUEL F. COLEMAN, Primary Examiner.

EDWARD A. SROKA, Examiner.